(12) United States Patent
Shimizu

(10) Patent No.: US 6,705,257 B2
(45) Date of Patent: Mar. 16, 2004

(54) APPARATUS AND METHOD FOR CONTROLLING VARIABLE VALVE IN INTERNAL COMBUSTION ENGINE

(75) Inventor: Hirokazu Shimizu, Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/989,379

(22) Filed: Nov. 21, 2001

(65) Prior Publication Data

US 2002/0062801 A1 May 30, 2002

(30) Foreign Application Priority Data

Nov. 27, 2000 (JP) ........................................ 2000-360056

(51) Int. Cl.$^7$ .................................................. F01L 1/34
(52) U.S. Cl. ................. 123/90.15; 123/90.16; 123/90.17
(58) Field of Search ........................ 123/90.15, 90.16, 123/90.17

(56) References Cited

U.S. PATENT DOCUMENTS

| | | | | |
|---|---|---|---|---|
| 5,497,737 A | * | 3/1996 | Nakamura | 123/90.15 |
| 5,517,955 A | * | 5/1996 | Yoshioka | 123/90.15 |
| 5,590,632 A | * | 1/1997 | Kato et al. | 123/480 |
| 6,109,225 A | * | 8/2000 | Ogita et al. | 123/90.15 |

FOREIGN PATENT DOCUMENTS

JP 2000-073797 3/2000

* cited by examiner

Primary Examiner—Thomas Denion
Assistant Examiner—Jaime Corrigan
(74) Attorney, Agent, or Firm—Sughrue Mion, PLLC

(57) ABSTRACT

An engine temperature and an engine start are detected, and if a lower temperature engine start of a predetermined temperature or lower is detected, while controlling the closing timing of an intake valve to the vicinity of the intake bottom dead center with respect to a reference valve operation characteristics to be normally set, valve overlapped amount is controlled to be equal to or less than a valve overlap amount in said reference valve operation characteristics.

13 Claims, 8 Drawing Sheets

APPARATUS AND METHOD FOR CONTROLLING VARIABLE VALVE IN INTERNAL COMBUSTION ENGINE

FIELD OF THE INVENTION

The present invention relates to a technology of controlling opening and closing timing of an intake valve and an exhaust valve in an internal combustion engine, especially to a technology of improving engine startability at a low temperature engine start.

RELATED ART OF THE INVENTION

There is a technology, for example, disclosed in Japanese Unexamined Patent Publication No. 2000-73797, for controlling opening and closing timing of an intake valve and an exhaust valve in order to improve engine startability.

In this technology, at an engine start time, a valve overlap of the intake valve and the exhaust valve is expanded with respect to valve operation characteristics at a low load and low rotation of an engine to be set by a normal control, to improve a start-up response of an engine rotation (cranking speed) at the engine start time by decreasing intake and exhaust loads, and then the valve control is returned to that in a normal valve timing when the engine rotation speed reaches a predetermined value or above.

In starting the engine at a low temperature, however, there is a case where the engine rotation speed is not increased due to a lack of a combustion pressure in initial explosion. In such a case, according to the above conventional technology, since the valve overlap continues to be expanded during the combustion after the initial explosion, a fluctuation in the combustion pressure becomes large due to an exhaust gas (internal EGR) taken into an intake air at a valve overlapped period, thereby bringing a misfire, an engine stall at the worse, and then a failure of engine start.

SUMMARY OF THE INVENTION

The present invention, in view of the forgoing problem, has been achieved and an object of the present invention is to improve engine startability at a low temperature engine start.

In order to achieve the above object, with the present invention, an intake valve and an exhaust valve are controlled as follows.

A temperature and starting of an engine are detected, and if a low temperature engine start at a predetermined temperature or lower is detected, a valve overlap amount in which the opening timing of the intake valve and the opening timing of the exhaust valve are overlapped with each other is set to be equal to or less than a valve overlap amount in reference valve operation characteristics to be normally set, while controlling the closing timing of the intake valve to the vicinity of the intake bottom dead center with respect to the reference valve characteristics.

By controlling the closing timing of the intake valve to the vicinity of the intake bottom dead center, an air amount (air charging efficiency) taken into the engine can be increased, so that a lack of combustion pressure in initial explosion at a low temperature engine start can be made up to ensure good engine startability. At the same time, since the valve overlap amount is set to be equal to or less than the valve overlap amount in the reference valve operation characteristics to be normally set at the engine start, a deterioration of the combustion performance due to an increase of an exhaust gas amount (internal EGR) taken into an intake air at a valve overlapped period after the initial explosion can be avoided.

The other objects and features of this invention will become understood from the following description with accompanying drawings.

BRIEF EXPLANATION OF THE DRAWINGS

FIG. 5 is a diagram showing the variable valve mechanism, in which

FIG. 6 is a diagram showing the variable valve mechanism, in which

EMBODIMENT

An embodiment according to the present invention will be explained as follows.

Figure 1:
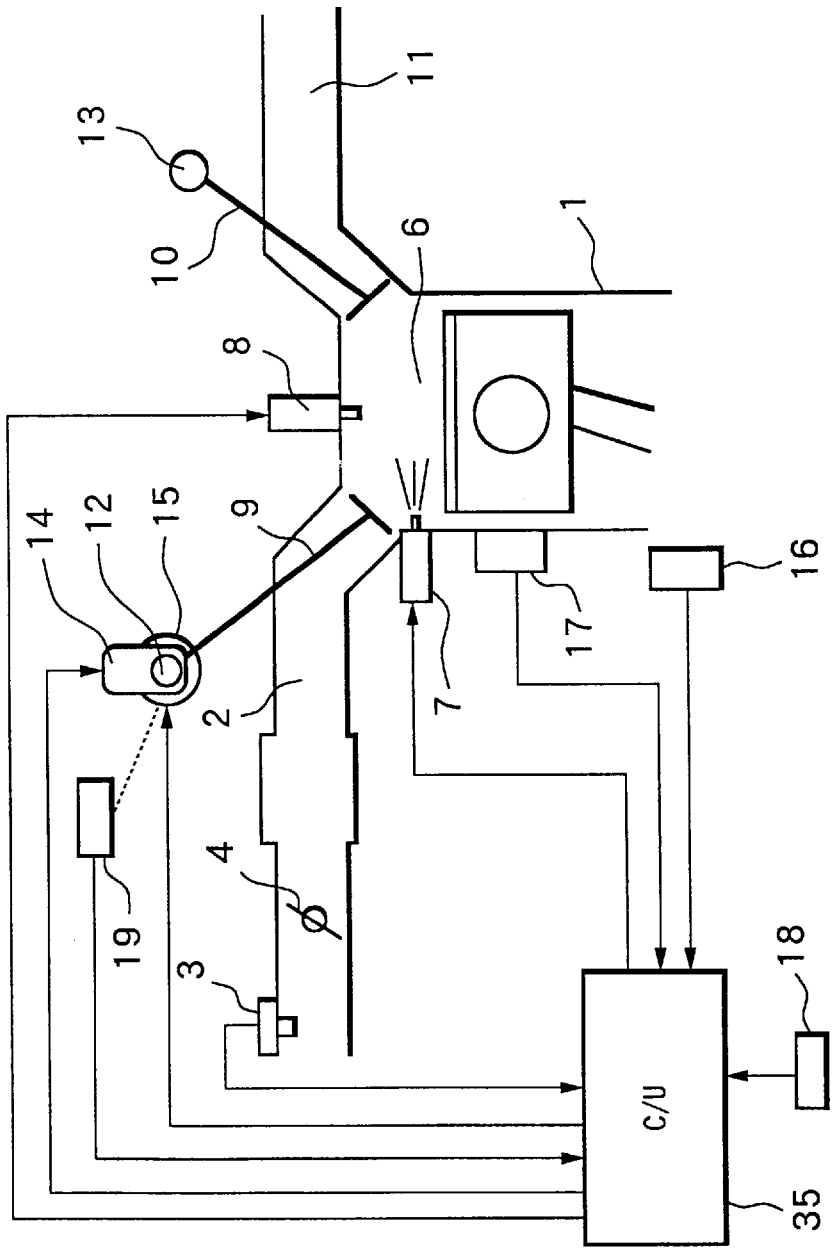
FIG. 1 is a system configuration of an internal combustion engine showing an embodiment according to the present invention.

In FIG. 1 showing a system configuration of the embodiment, in an intake passage 2 of an engine 1 is disposed an air flow meter 3 detecting an intake air flow amount Q, which is controlled by a throttle valve 4.

In each cylinder of engine 1, a fuel injection valve 7 injecting a fuel into a combustion chamber 6 and an ignition plug 8 spark igniting in combustion chamber 6. Fuel is injected from fuel injection valve 7 to air sucked through an intake valve 9 to form the air-fuel mixture and this air-fuel mixture is compressed in combustion chamber 6 and then spark ignited by ignition plug 8.

An exhaust gas of engine 1 is emitted to an exhaust passage 11 from combustion chamber 6 through an exhaust valve 10 and is discharged into the atmosphere through an exhaust purification catalytic converter and a muffler not shown.

Intake valve 9 and exhaust valve 10 are driven to open/close by cams disposed respectively on an intake side camshaft 12 and an exhaust side camshaft 13.

On the side of intake valve 9 is disposed a known mechanism 14 (hereinafter, VEL) to variably control a valve lift amount and an operating angle of the intake valve by changing a swing characteristic of the cam and also at an end portion of intake side camshaft 12 is disposed a known mechanism (hereinafter, VTC) to advance/retard the opening and closing timing of the intake valve by changing a rotation phase of the camshaft with respect to a crank angle.

Figure 2:
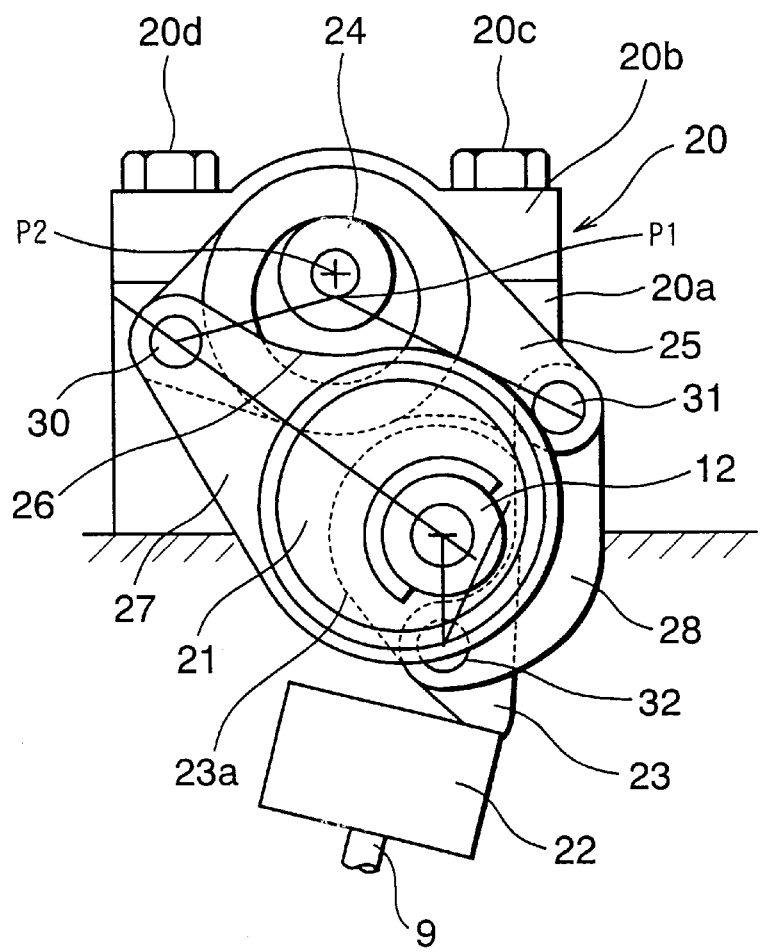
FIG. 2 is a diagram showing a variable valve mechanism to change an operating angle of an intake valve.
Figure 3:
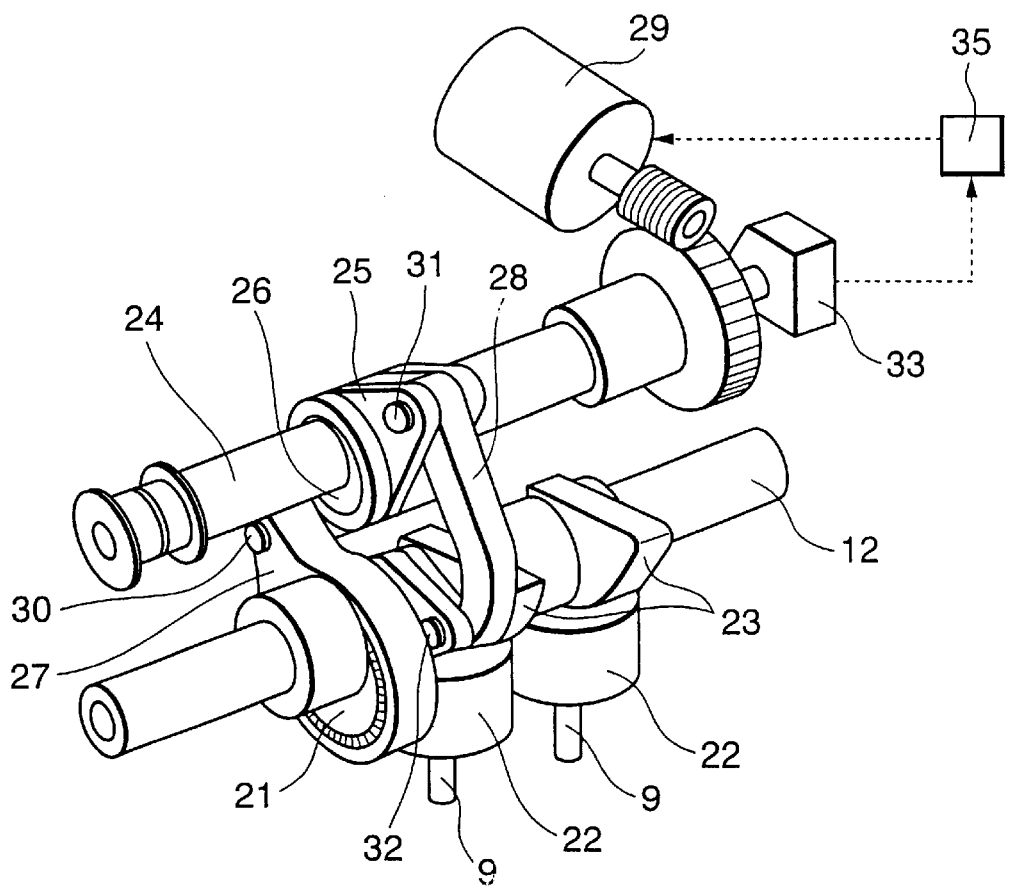
FIG. 3 is a perspective view showing the variable valve mechanism to change the operating angle of the intake valve.
Figure 4:
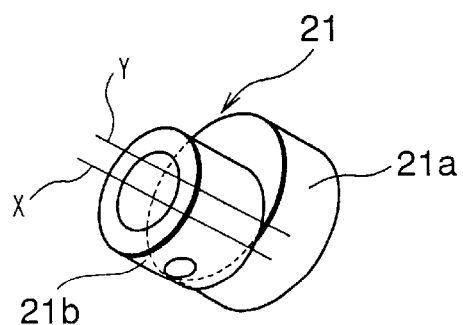
FIG. 4 is a perspective view of a drive cam used in the variable operating mechanism.

In the present embodiment, each cylinder is equipped with two intake valves. VEL 14, as shown in FIGS. 2 and 3, comprises: a bearing 20 at a cylinder head upper portion; intake side camshaft 12 (drive shaft) rotatably supported by bearing 20; a drive cam 21 fixed to drive shaft 12; cams 23, 23 (swing cams) each disposed so that a relative position thereof is variable with respect to drive shaft 12, to drive, respectively, intake valves 9, 9 to open and close through valve lifters 22, 22; a control shaft 24 disposed parallel to drive shaft 12 at an upper side of drive shaft 12 and rotatably supported by bearing 20; a control cam 26 fixed to control shaft 24 and serving as a supporting point for swing of an arm 25; a first link member 27; and a second link member 28.

Bearing 20 includes: a main bracket 20 disposed at an upper end portion of the cylinder head to support an upper portion of drive shaft 12; and a sub bracket 20b disposed at an upper end portion of main bracket 20a to support control shaft 24. Both brackets 20a and 20b are jointly fastened by a pair of bolts 20c, 20d.

A rotation force from crankshaft of engine 1 is transmitted to drive shaft 12 with VTC 15 at one end thereof.

Drive cam 21 consists of a cam body 21a and a cylindrical portion 21b the inside of which drive shaft 12 is inserted through. The axis center Y of cam body 21a is offset by a predetermined amount in the radial direction from the axis center X of drive shaft 12.

Each of valve lifters 22, 22 is formed in a cylindrical shape with a lid and is retained slidably in a retaining hole of cylinder head not shown. Swing cams 23, 23 slidably contact upper surfaces of valve lifters 22, 22, respectively.

Each of swing cams 23, 23 is constructed so that a cam surface 23a thereof is in contact with a predetermined position of the upper surface of valve lifter 22 corresponding to a swing position of swing cam 23, to obtain a predetermined valve lift amount and a predetermined operating angle.

Control shaft 24 is rotated within a predetermined rotation angle range by an electromagnetic actuator 29 disposed at one end portion thereof.

Control cam 26 is formed in a cylindrical shape and its axis center P1 is biased by a predetermined amount from the axis center P2 of control shaft 24.

First link member 27 is rotatably mounted to an outer periphery of drive cam 21, and is connected to arm 25 by a pin 30 rotatably inserted into first link member 27, to transmit an eccentric motion of eccentric drive cam 21 to arm 25.

Second link member 28 connects arm 25 with swing cams 23, 23 by pins 31, 32 rotatably inserted into second link member 28, to transmit a swing motion of arm 25 to swing cams 23, 23.

A control unit (C/U) 35 incorporates therein a microcomputer and controls a fuel injection quantity and timing of fuel injection by fuel injection valve 7, ignition timing of ignition plug 8, and the like based on various detection signals input therein.

Various detection signals input to C/U 35 include an intake air amount signal Q from air flow meter 3, a crank angle signal from a crank angle sensor 16, a cooling water temperature signal Tw of the engine from a water temperature sensor 17, an ON/OFF signal from a start switch 18 and the like. An engine rotation speed Ne is calculated based on the crank angle signal.

C/U 35 detects opening and closing timing of the intake valve by detecting a rotation phase of the intake camshaft with respect to the crankshaft based on detection signals from crank angle sensor 16 and cam sensor 19, and detects a rotation position of control shaft 24 based on a signal from a potentiometer 33.

Then, C/U 35 controls intake valve 9 and exhaust valve 10 based on information of an engine load, the engine rotation speed, the cooling water temperature Tw and so on.

A target phase (target advance value or target retard value) of intake side camshaft 12, a target valve lift amount and a target operating angle are determined, and intake side camshaft 12 is adjusted so as to achieve these target values to thereby control intake valve 9.

An operation of VEL 14 will be explained based on FIGS. 5 and 6.

When control shaft 24 is driven to rotate in the clockwise direction by a control signal from C/U 35 through electromagnetic actuator 29, the axis center P1 of control cam 26 is held in a rotation angle position of an upper left side from the axis center P2 of control shaft 24, and a thick portion 26a of control cam 26 moves away from drive shaft 12 to an upper side (move from a position in FIG. 2 to a position of FIG. 5).

Figure 5A:
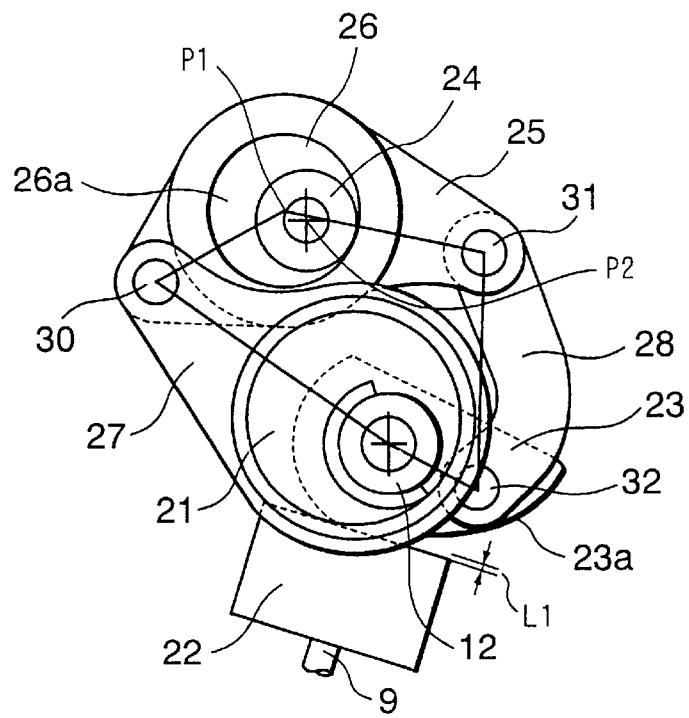
FIG. 5A shows an opening state and FIG. 5B shows a closing state, respectively, of the intake valve at a minimum lift L1 (minimum operating angle).
Figure 5B:
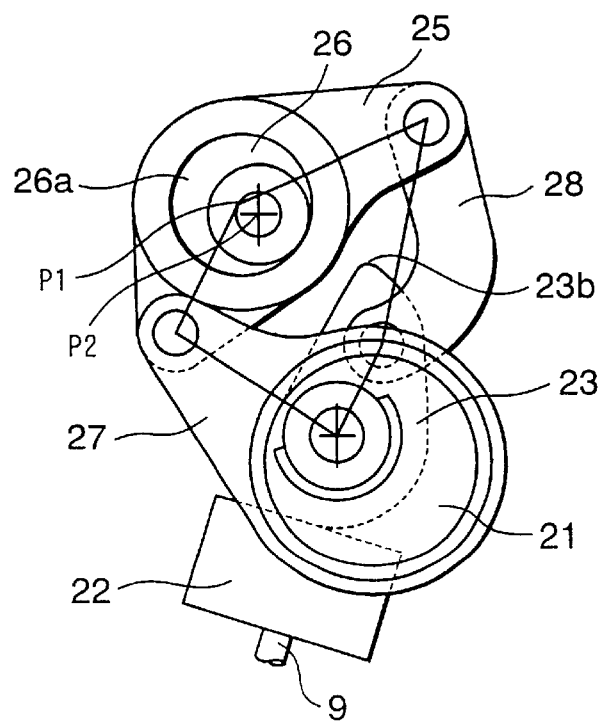

Accordingly, arm 25 as a whole moves to an upper side relative to drive shaft 12 and swing cam 23 is rotated in the counterclockwise direction with its cam nose portion 23b being raised up through second link member 28c (FIG. 5B).

Therefore, as shown in FIG. 5A, when drive cam 21 is rotated to perform a motion of pushing up one end 25a of arm 25 through second link member 28, this motion is transmitted to the swing cam 23 and valve lifter 22 through first link member 27. As a result, a valve lift amount L1 as well as an operating angle H1 gets smaller at the same time.

On the other hand, when control shaft 24 is driven to rotate in the counterclockwise direction by electromagnetic actuator 29, as shown in FIG. 6, control cam 26 is rotated in the counterclockwise direction from a position shown in FIG. 5 and moves the axis center P1 (thick portion 26a) to a downward direction.

As a result, arm 25 as a whole moves to a direction of drive shaft 12 (downward) and the swing cam 23 is rotated in the clockwise direction by a predetermined value by its cam nose portion 23b being pushed down through second link member 28.

Figure 6A:
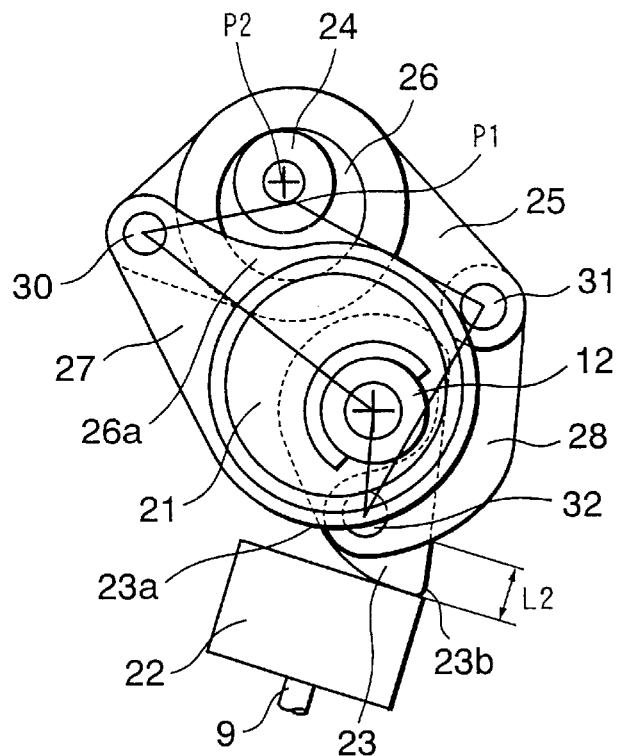
FIG. 6A shows the opening state and FIG. 6B shows the closing state, respectively, of the intake valve at a maximum lift L2 (maximum operating angle).
Figure 6B:
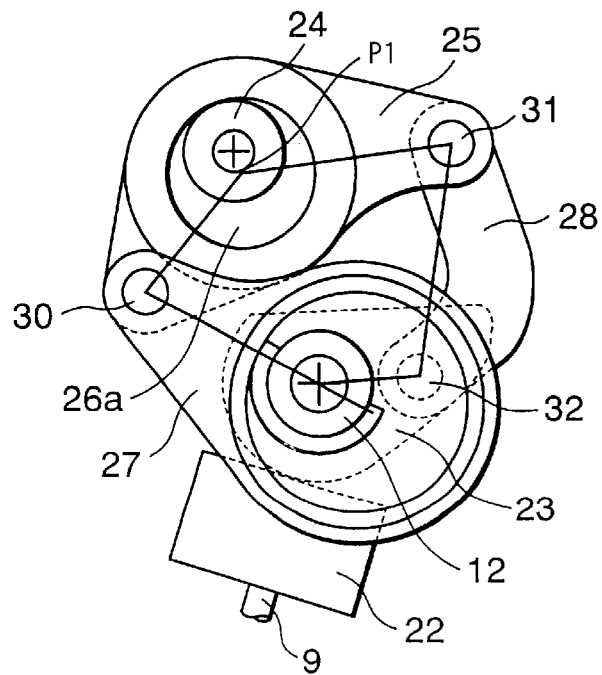

Accordingly, a contact position of cam surface 23a of swing cam 23 with an upper surface of valve lifter 22, as shown in FIG. 6B, moves to cam nose portion 23b. Then, as shown in FIG. 6A, when drive cam 21 is rotated to perform a motion of pushing up one end 25a of arm 25 through first link member 27, a valve lift amount L2 for valve lifter 22 as well as an operating angle H2 gets larger.

Figure 7:
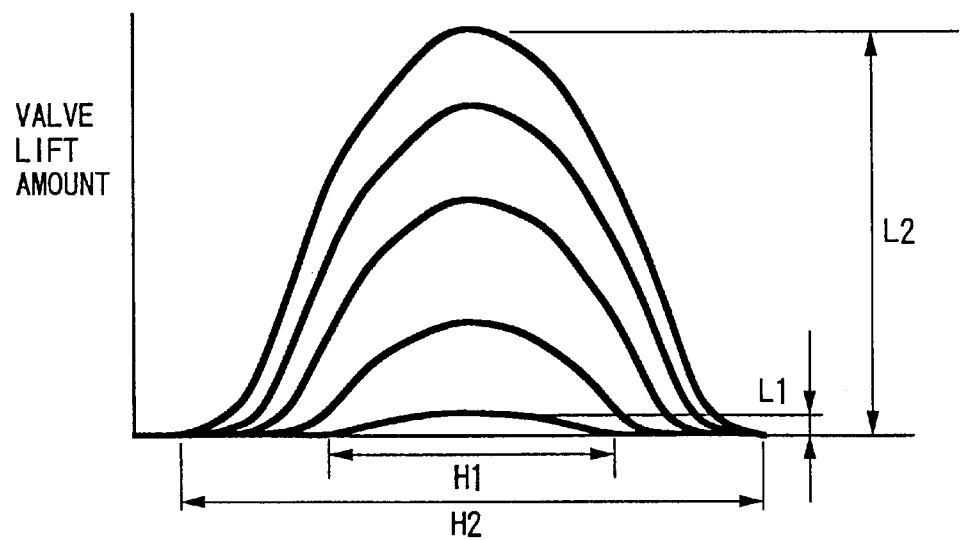
FIG. 7 is a graph showing valve lift characteristics (operating angle) of the intake valve.

As the above, by changing a rotation angle of control shaft 24, the operating angle H and valve lift amount L can be changed as shown in FIG. 7.

Figure 8:
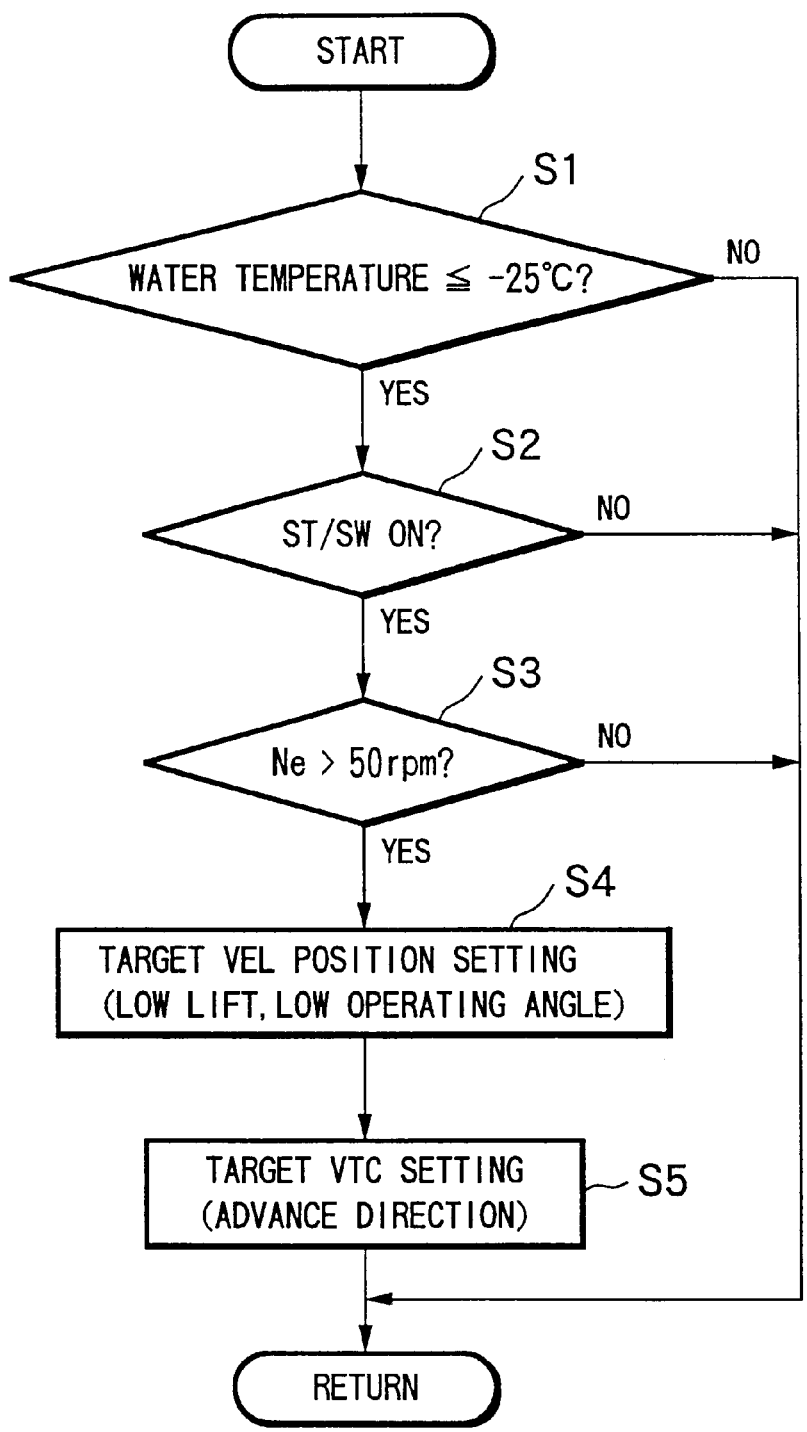
FIG. 8 is a flowchart showing a valve control according to the present invention.

A variable valve control at a low temperature engine start will be explained based on a flowchart in FIG. 8.

This control relates to a valve control for when it is judged that an engine operation is started in an extremely low temperature region, and it is a cranking period and an initial explosion has been completed.

At Step 1 (S1 in the figure, the same rule applied to the followings), it is judged whether or not the engine is at a low temperature region of a predetermined temperature or lower (in the present embodiment, it is judged whether or not the engine cooling water temperature is at an extremely low temperature region of −25° C. or lower).

If the engine cooling water temperature is equal to or less than the predetermined temperature, the procedure goes to Step 2, while, if the engine cooling water temperature exceeds the predetermined temperature, this control is not performed (namely, a normally set valve timing control is executed).

At Step 2, it is judged whether the start switch is ON or OFF. If the start switch is ON (namely, the cranking period), the procedure goes to Step 3, while, if the start switch is OFF, this control is not performed.

At Step 3, it is judged whether or not the engine rotation speed Ne exceeds a predetermined rotation speed (for example, 50 rpm).

If the engine rotation speed Ne exceeds the predetermined rotation speed, it is judged that the initial explosion has been completed at the extremely low temperature region, and the procedure goes to Step 4, where an air amount to be taken into the engine is increased to compensate for a lack of the combustion pressure due to the initial explosion.

At Step 4, a target VEL position (in general, a low lift side and a low operating angle side) is set and the operating angle of the intake valve is controlled to a crank angle of about 180°.

This control is performed by rotating control shaft 24 by a target rotation angle with reference to rotation angle—valve lift amount (operating angle) characteristics of control shaft 24 measured and stored in advance.

Figure 9:
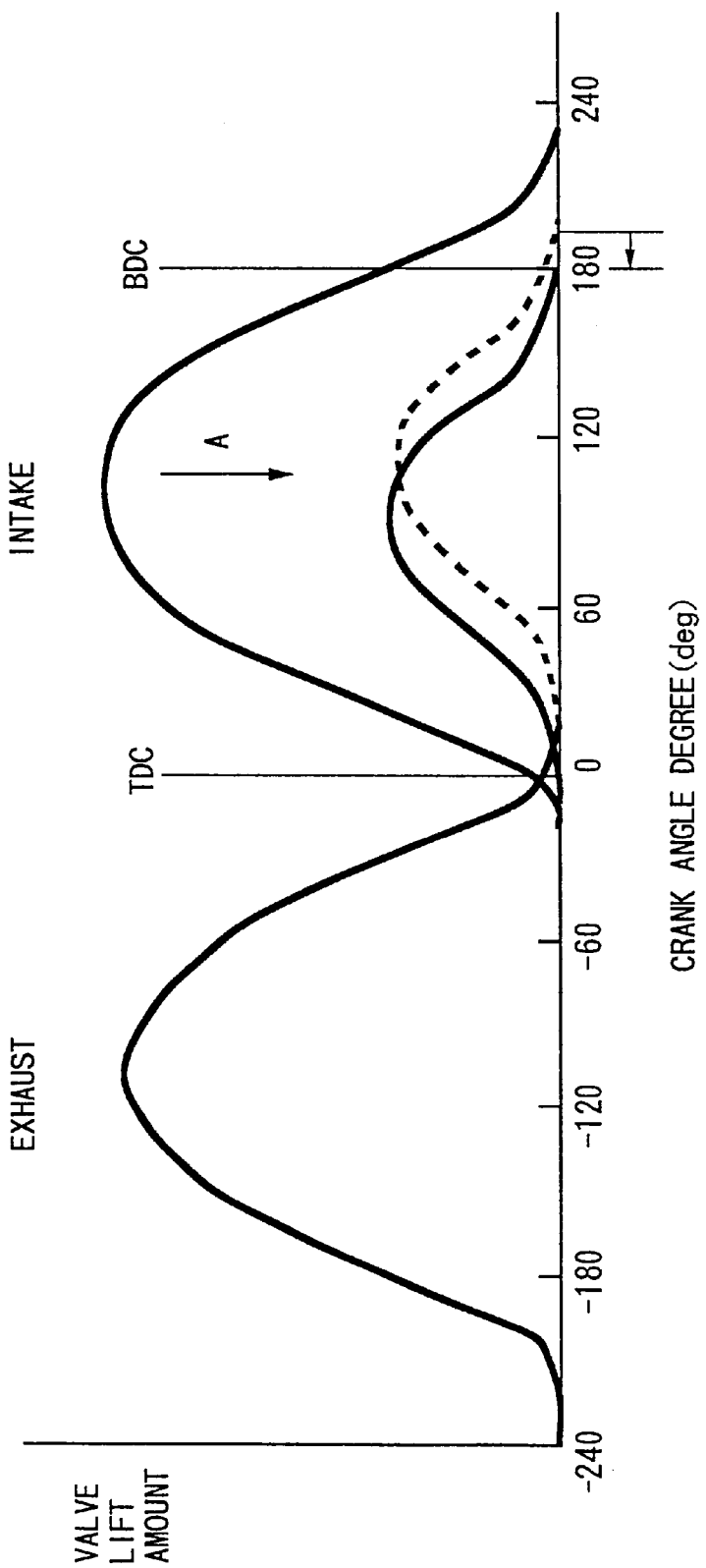
FIG. 9 is a graph showing a state of intake valve state after the valve control according to the present invention.

Namely, if an operating angle to be set by a normal control (an operating angle to be set based on engine operating conditions, such as an engine load, an engine rotation speed), as shown in FIG. 9, is controlled to a low valve lift side (arrow A in the figure), the valve opening timing is shifted to a retard side and the valve closing timing is shifted to an advance side, symmetrically with each other, with a crank angle where the valve lift has a maximum value as the center, so that the operating angle reaches about 180° (dotted line in the figure).

At Step 5, a target VTC position (in general, an advance side) is set and the closing timing of the intake valve, for which operating angle has been set about 180° at Step 4, is controlled to the vicinity of the intake bottom dead center (so as to substantially equal to the intake bottom dead center).

By the procedures at Steps 4 and 5 as the above, the valve overlap amount is eliminated to control the opening timing of the intake valve to the vicinity of the intake top dead center and the closing timing to the vicinity of the intake bottom dead center, respectively, while avoiding a deterioration of the combustion performance due to the internal EGR.

Thus, although the valve characteristic is controlled to the low valve lift side, due to the low rotation, the engine startability at the low temperature can be improved by an increase of an intake air amount (charging efficiency).

In this embodiment, the opening timing and the closing timing of the intake valve are substantially equal to the intake top dead center and the intake bottom dead center, respectively, to thereby improve the intake air amount (charging efficiency). More simply, only the closing timing of the intake valve especially influencing on an engine output may be controlled to the vicinity of the intake bottom dead center without an increase of the valve overlap amount.

Especially, in case a mechanism (VEL) in which a valve lift amount and a valve operating angle are synchronized with each other (as the valve lift amount gets lower, the operating angle gets smaller) is used, when the closing timing is controlled to the intake bottom dead center (advance) by adjusting the operating angle of the intake valve, as a consequence, the opening timing is shifted to get closer to the intake top dead center. Therefore, it is also possible to control the closing timing and the opening timing of the intake valve to the intake bottom dead center and the intake top dead center, respectively, only by adjusting the operating angle.

On the other hand, by using both of mechanisms VEL and VTC, it is possible to perform the control of arbitrary valve timings depending respective operating conditions.

In the embodiment, the engine cooling water temperature has been used for the detection of low temperature state of the engine. However, the present invention is not limited thereto and an engine lubricating oil temperature may be used instead.

The entire contents of basic Japanese Patent Application No. 2000-360056, filed Nov. 27, 2000, of which priority is claimed, are herein incorporated by reference.

What is claimed:

1. A method for controlling a variable valve in an internal combustion engine provided with at least an intake valve, comprising:

detecting an engine temperature and an engine start;

when a lower temperature engine start of a predetermined temperature or lower is detected, setting a valve operation characteristic at low temperature engine start time so that, at a lower temperature engine start of a predetermined temperature or lower, the closing timing of said intake valve is set to the vicinity of the intake bottom dead center with respect to a reference valve operation characteristic to be normally set based on engine operating conditions, and also, a valve overlap amount in which the opening timing of the intake valve and the opening timing of an exhaust valve are overlapped with each other is set to be equal to or less than a valve overlap amount in said reference valve operation characteristic; and adjusting an operating angle to the intake valve to control a valve operation characteristic to said valve operation characteristic at the low temperature engine start time.

2. A method for controlling a variable valve in an internal combustion engine provided with at least an intake valve according to claim 1, further comprising:

adjusting the operating angle of the intake valve and a rotation phase of an intake side camshaft with respect to a crank angle to control a valve operation characteristic to said valve operation characteristic at the low temperature engine start time.

3. A method for controlling a variable valve in an internal combustion engine provided with at least an intake valve according to claim 1, wherein the operating angle of the intake valve is controlled to about 180° at the low temperature engine start time and also the closing timing of the intake valve is controlled to the vicinity of the intake dead bottom center by adjusting the rotation phase of the intake side camshaft with respect to the crank angle.

4. A method for controlling a variable valve in an internal combustion engine provided with at least an intake valve according to claim 1, wherein said engine temperature is detected from an engine cooling water temperature.

5. A method for controlling a variable valve in an internal combustion engine provided with at least an intake valve according to claim 1, wherein said engine temperature is detected from an engine lubricating oil temperature.

6. A method for controlling a variable valve in an internal combustion engine provided with at least an intake valve, comprising:

detecting an engine temperature and an engine start;

when a lower temperature engine start of a predetermined temperature or lower is detected, setting a valve operation characteristic at low temperature engine start time so that, at a lower temperature engine start of a predetermined temperature or lower, the closing timing of said intake valve is set to the vicinity of the intake bottom dead center with respect to a reference valve operation characteristic to be normally set based on engine operating conditions, and also, a valve overlap amount in which the opening timing of the intake valve and the opening timing of an exhaust valve are overlapped with each other is set to be equal to or less than a valve overlap amount in said reference valve operation characteristic;

when it is judged that engine operation is started at the low temperature, and it is a cranking period and an initial explosion has been completed, controlling a valve operation characteristic to said valve operation characteristic at the low temperature engine start time by adjusting an operating angle of the intake valve.

7. An internal combustion engine system having an apparatus for controlling a variable valve in an internal combustion engine, comprising:

an engine provided with at least an intake valve, the opening timing and closing timing of which are variably controlled;

a temperature detection unit that detects an engine temperature;

an engine start detection unit that detects an engine start;

an engine operating condition detection unit that detects engine operating conditions including an engine load and an engine rotation speed;

a reference valve operation characteristics setting unit that sets a reference valve operation characteristic based on the detected engine operating conditions;

a low temperature engine start time valve operation characteristics setting unit that sets a valve operation characteristic at low temperature engine start time so that, at a lower temperature engine start of a predetermined temperature or lower, the closing timing of said intake valve is set to the vicinity of the intake bottom dead center with respect to said reference valve operation characteristic to be normally set, and also, a valve overlap amount in which the opening timing of the intake valve and the opening timing of an exhaust valve are overlapped with each other is set to be equal to or less than a valve overlap amount in said reference valve operation characteristic; and a valve operation characteristics adjusting mechanism that adjusts a valve operation characteristic to achieve the valve operation characteristic at a low temperature engine start time set by said low temperature engine start time valve operating characteristics setting unit, wherein said valve operation characteristics adjusting mechanism adjusts a valve operation characteristic to said valve operation characteristic at the low temperature engine start time by adjusting an operating angle of the intake valve.

8. An internal combustion engine system having an apparatus for controlling a variable valve in an internal combustion engine according to claim 7, wherein
   said valve operation characteristic adjusting mechanism adjusts the valve operation characteristic to said valve operation characteristic at the low temperature engine start time by adjusting the operating angle of the intake valve and a rotation phase of an intake side camshaft with respect to a crank angle.

9. An internal combustion engine system having an apparatus for controlling a variable valve in an internal combustion engine according to claim 7, wherein
   said valve operation characteristics adjusting mechanism sets the operating angle of the intake valve to about 180° and also sets the closing timing of the intake valve to the vicinity of the intake dead bottom center.

10. An internal combustion engine system having an apparatus for controlling a variable valve in an internal combustion engine according to claim 7, wherein
    said temperature detection unit detects an engine cooling water temperature.

11. An internal combustion engine system having an apparatus for controlling a variable valve in an internal combustion engine according to claim 7, wherein
    said temperature detection unit detects an engine lubricating oil temperature.

12. An internal combustion engine system having an apparatus for controlling a variable valve in an internal combustion engine according to claim 7, wherein
    said valve operation characteristic adjusting mechanism comprises:
    a drive shaft that is rotated in synchronization with a crankshaft of the engine and is provided with a drive cam on an outer periphery thereof;
    a swing cam that is supported to be swingable by a predetermined axis to open/close the intake valve;
    a first link member, one end portion of a circular shape of said first link member being slidably inserted into an outer periphery of the drive cam;
    an arm that is swingably disposed on a control shaft positioned substantially parallel to said drive shaft, with one end of said arm being rotatably linked to the other end of said first link member and the other end of said arm being linked to said swing cam through a second link member rotatably mounted at the other end of said arm; and
    a control cam that is fixed at an outer periphery of said control shaft in an eccentric state to change a swing point of said arm corresponding to a rotation position of said control shaft, wherein
       an operating angle and a valve lift amount of said intake valve are variably adjusted by changing a contact position of a cam face of said swing cam with said intake valve corresponding to a change in said swing point of said arm.

13. An internal combustion engine system having an apparatus for controlling a variable valve in an internal combustion engine, comprising:
    an engine provided with at least an intake valve, the opening timing and closing timing of which are variably controlled;
    a temperature detection unit that detects an engine temperature;
    an engine start detection unit that detects an engine start;
    an engine operating condition detection unit that detects engine operating conditions including an engine load and an engine rotation speed;
    a reference valve operation characteristics setting unit that sets a reference valve operation characteristics based on the detected engine operating conditions;

a low temperature engine start time valve operation characteristics setting unit that sets a valve operation characteristic at low temperature engine start time so that, at a lower temperature engine start of a predetermined temperature or lower, the closing timing of said intake valve is set to the vicinity of the intake bottom dead center with respect to said reference valve operation characteristic to be normally set, and also, a valve overlap amount in which the opening timing of the intake valve and the opening timing of the exhaust valve are overlapped with each other is set to be equal to or less than a valve overlap amount in said reference valve operation characteristic; and a valve operation characteristic adjusting mechanism that adjusts a valve operation characteristic to achieve the valve operation characteristic at low temperature engine start time set by said low temperature engine start time valve operating characteristics setting unit, said apparatus further comprising:

an explosion completion judging unit that judges the completion of an initial explosion of engine, wherein when it is judged that an engine operation is started in an extremely low temperature region, and it is a cranking period and the initial explosion has been completed, said valve operation characteristic adjusting mechanism adjust variable operation characteristic to said valve operation characteristic at the low temperature engine start time.

* * * * *